(12) United States Patent
Blanchflower et al.

(10) Patent No.: US 11,048,934 B2
(45) Date of Patent: Jun. 29, 2021

(54) IDENTIFYING AUGMENTED FEATURES BASED ON A BAYESIAN ANALYSIS OF A TEXT DOCUMENT

(71) Applicant: LONGSAND LIMITED, Cambridge (GB)

(72) Inventors: Sean Blanchflower, Cambridge (GB); Christopher Ogden, Cambridge (GB); John Simon Fothergill, Cambridge (GB)

(73) Assignee: LONGSAND LIMITED, Cambridgeshire (GB)

( * ) Notice: Subject to any disclaimer, the term of this patent is extended or adjusted under 35 U.S.C. 154(b) by 142 days.

(21) Appl. No.: 15/755,823

(22) PCT Filed: Aug. 27, 2015

(86) PCT No.: PCT/EP2015/069697
§ 371 (c)(1),
(2) Date: Feb. 27, 2018

(87) PCT Pub. No.: WO2017/032427
PCT Pub. Date: Mar. 2, 2017

(65) Prior Publication Data
US 2018/0330202 A1 Nov. 15, 2018

(51) Int. Cl.
*G06K 9/62* (2006.01)
*G06K 9/00* (2006.01)
(Continued)

(52) U.S. Cl.
CPC ......... *G06K 9/00469* (2013.01); *G06F 40/20* (2020.01); *G06F 40/258* (2020.01); *G06K 9/6278* (2013.01)

(58) Field of Classification Search
CPC ... G06F 17/27; G06F 17/2745; G06K 9/6278; G06K 9/00469
See application file for complete search history.

(56) References Cited

U.S. PATENT DOCUMENTS 5,873,056 A 2/1999 Liddy et al.
8,620,836 B2 12/2013 Chani et al.
(Continued)

FOREIGN PATENT DOCUMENTS

WO WO-2008029153 3/2008

OTHER PUBLICATIONS

Ahmed S et al., "Bayes Optimal Features Selection for supervised Learning with General Performance measures,"31st Conference on Uncertainty in Artificial Intelligence (UAI 2015), Jul. 12-16, 2015, Amsterdam, NL. Jul. 12, 2015.*
(Continued)

*Primary Examiner* — John W Lee

(57) ABSTRACT

Identification of augmented features based on a Bayesian analysis of a text document is disclosed. One example is a system including a document processing module, a feature processing module, and a feature generation module. The document processing module receives a text document via a processor. The feature processing module automatically identifies, based on a Bayesian analysis of the text document, a plurality of augmented features in the text document, the plurality of augmented features including at least one of local, sectional, and document-level features of the text document, and extracts, via the processor, the identified plurality of augmented features from the text document. The feature generation module generates, via the processor, a feature representation of the text document based on the extracted plurality of augmented features.

17 Claims, 3 Drawing Sheets

(51) Int. Cl.
*G06F 40/20* (2020.01)
*G06F 40/258* (2020.01)

(56) References Cited

U.S. PATENT DOCUMENTS

| | | | |
|---|---|---|---|
| 8,626,682 B2 | 1/2014 | Malik et al. | |
| 8,856,123 B1* | 10/2014 | Forman | G06F 16/31 |
| | | | 707/737 |
| 8,996,350 B1 | 3/2015 | Dub et al. | |
| 2005/0259866 A1* | 11/2005 | Jacobs | G06K 9/00463 |
| | | | 382/157 |
| 2006/0045322 A1* | 3/2006 | Clarke | G06K 9/186 |
| | | | 382/137 |
| 2007/0282892 A1* | 12/2007 | Probst | G06F 40/20 |
| 2009/0667729 | 3/2009 | Turkelson et al. | |
| 2011/0243450 A1* | 10/2011 | Liu | G06K 9/6297 |
| | | | 382/190 |
| 2012/0041955 A1* | 2/2012 | Regev | G06F 16/355 |
| | | | 707/740 |
| 2014/0156567 A1 | 6/2014 | Scholtes | |
| 2014/0222719 A1 | 8/2014 | Poulin et al. | |

OTHER PUBLICATIONS

Chen N et al., "A Survey of Document Image Classification; problem statement, classifier architecture and performance evaluation," International Journal of document analysis and recognition (IJDAR), vol. 10, Aug. 3, 2006.*
International Searching Authority, "international search report and Written opinion dated Jun. 29 for PCT Application No. PCT/EP2015/069697," Aug. 27, 2015, 15 pages.*
Hofmann, T., Unsupervised Learning by Probabilistic Latent Semantic Analysis, Jan. 2001, Machine Learning, No. 42, pp. 177-196.

* cited by examiner

IDENTIFYING AUGMENTED FEATURES BASED ON A BAYESIAN ANALYSIS OF A TEXT DOCUMENT

BACKGROUND

Text classification generally involves an association of textual documents with document classes. A variety of text classification tasks are based on an extraction of features from a text document. Machine learning models may be trained for text classification. In many instances, the training process may generate a "bag of words" for each text document, where each word (or phrase) may be treated as an independent feature.

DETAILED DESCRIPTION

Text classification is the assignment of textual documents to separate classes. Generally, classification relies on "training" texts that may be utilized to define each class. In many instances, the training process may treat each text as a "bag of words", where each word (or phrase) is treated as an independent feature.

In some examples, however, this process may be insufficient due to the spatial and/or positional nature of certain features. Examples of such classes may include classes defined by a presence of certain format features, such as a table of a certain type, or by a length and/or structure of text within the text document. In some examples, a class may require a text document to be associated with a given topic, and to include positional features, such as a positive value in a particular portion of a table. Existing rules-based approaches are generally unable to accommodate such spatial and/or structural characteristics.

Also, for example, existing techniques may generally apply Bayesian analyses to text classification after the features have been extracted from the document, and feature representations are generated. However, as described herein, Bayesian analysis may be effectively applied to the process of identifying and extracting the features as well, to create an intelligent machine learning model.

As described in various examples herein, identifying augmented features based on a Bayesian analysis of a text document is disclosed. One example is a system including a document processing module, a feature processing module, and a feature generation module. The document processing module receives a text document via a processor. The feature processing module automatically identifies, based on a Bayesian analysis of the text document, a plurality of augmented features in the text document, the plurality of augmented features including at least one of local, sectional, and document-level features of the text document, and extracts, via the processor, the identified plurality of augmented features from the text document. The feature generation module generates, via the processor, a feature representation of the text document based on the extracted plurality of augmented features.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
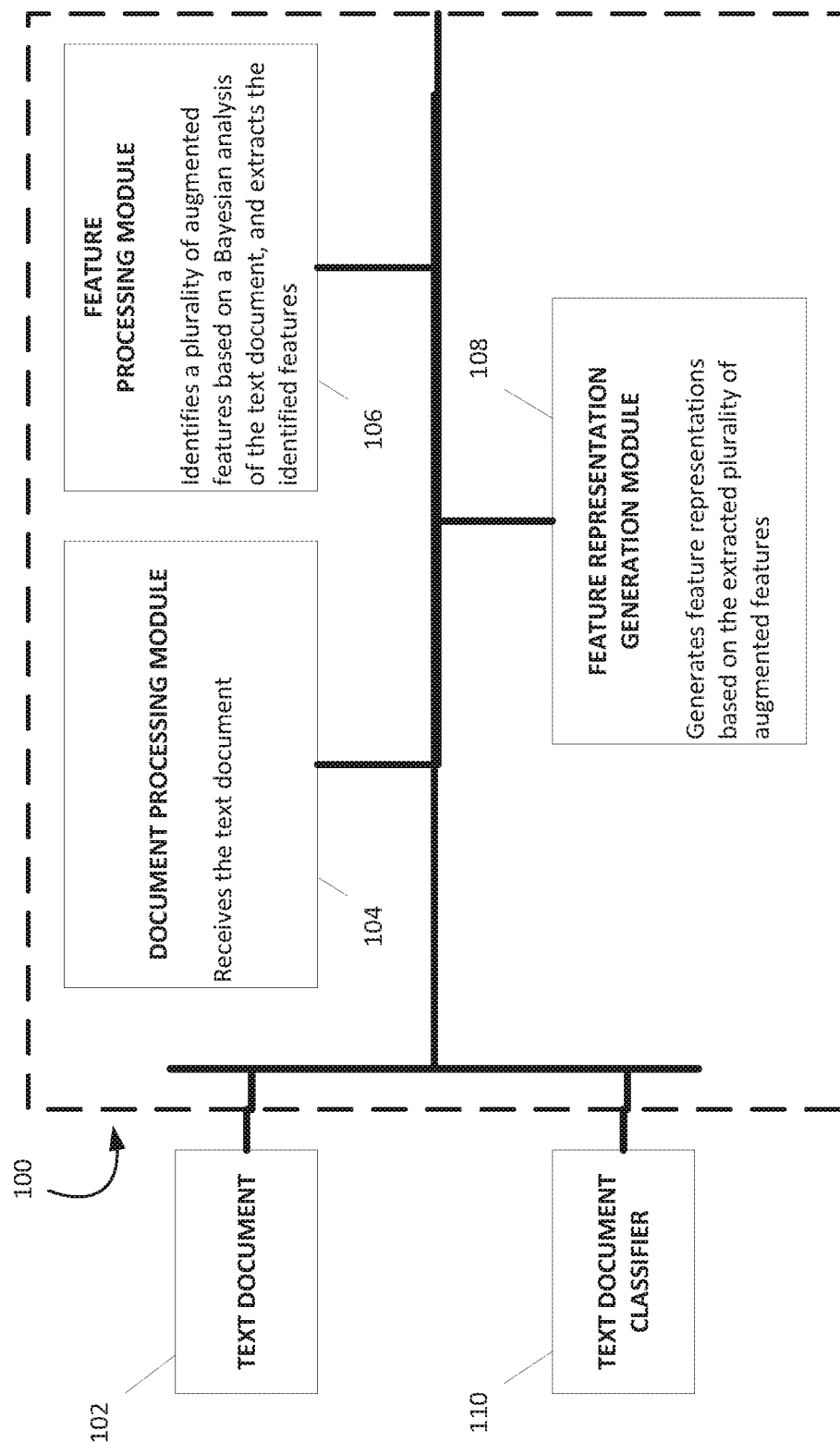
FIG. 1 is a functional block diagram illustrating one example of a system for identifying augmented features based on a Bayesian analysis of a text document.

FIG. 1 is a functional block diagram illustrating one example of a system 100 for identifying augmented features based on a Bayesian analysis of a text document. System 100 includes a document processing module 104, a feature processing module 106, and a feature representation generation module 108. The document processing module 104 may receive a text document 102 via a processor. As used herein, a text document may be any document that includes textual content. In some examples, the text document 102 may include content in addition to textual content. In some examples, the textual content may include content in one or more languages. In some examples, the textual content may include known entities, such as, for example, numerals, symbols, dates, names, places, things, geographical locations, units of measurement, currency symbols, icons, logos, and so forth.

In some examples, the textual content may include features such as format features, and/or structural characteristics of the text document 102. In some examples, the format features may include whitespace, lines, paragraphs, font characteristics, and so forth. In some examples, a proportion and position of whitespace in a document may be a format feature of the text document 102. Also, for example, format features may include a line, a paragraph, a section, tabbed content, and so forth. In some examples, the font characteristics may include, for example, a font script (e.g., Arial, Calibri, and so forth), a font size, weight of a font (e.g., bold), and a slope of a font (e.g., italics). In some examples, the format features may include underlined text, superscript, subscript, and so forth.

The structural characteristics may generally include features related to a structure that includes textual content in the text document 102. In some examples, the structural characteristics may include, for example, a position of the text in the text document 102. For example, a position of textual content in the text document 102 may be associated with a headline, chapter heading, section heading, figure caption, title, and so forth. In some examples, the structural characteristics may include relative positions of different components of the textual content in the text document 102. For example, line spacing, paragraph spacing, indentation, and so forth may be some structural characteristics. In some examples, the structural characteristics may include a table, a list, a grid, and so forth.

Generally, the text document 102 may be a single document, and/or a corpus of documents. In some examples, the text document 102 may be received by the document processing module 104 for a document classification task. In some examples, the document processing module 104 may receive a list of classes for classification of the text document 102. For example, the text document 102 may be associated with a list of classes to which the text document 102 may belong. For example, a plurality of documents may be received by the document processing module 104, along with an indication to classify them into a list of classes including, for example, bank statements, income statements, phone bills, and credit card statements.

In some examples, the document processing module 104 may pre-process the text document 102 to remove stop words, and apply stemming techniques (e.g., Porter stemming algorithm). In some examples, the document processing module 104 may remove whitespace. As described herein, in some examples, a Bayesian analysis of the text document 102 may enable system 100 to influence the pre-processing phase of the document processing module 104. For example, the position and amount of whitespace may be inferred to be a significant feature of the text document 102, and the document processing module 104 may identify such data and provide the data to the feature processing module 106.

System 100 includes the feature processing module 106 to automatically identify, based on a Bayesian analysis of the text document 102, a plurality of augmented features in the text document 102, where the plurality of augmented features may include at least one of local, sectional, and document-level features of the text document 102. As described herein, standard features included in a "bag of words" feature extraction is extended with Bayesian statistical and conceptual analysis, to identify the plurality of augmented features in the text document 102.

Bayesian analysis is a method of statistical analysis (e.g., statistical inference) in which Bayes' theorem is used to update the probability for a hypothesis as evidence is acquired. Bayesian inference may be generally utilized in a dynamic analysis of text documents as they are received by the system 100. In document classification, Bayesian analysis has been utilized for document classification after features have been identified and extracted. However, as described herein, Bayesian analysis may be utilized in the identification of the features as well. For example, a plurality of text documents may be received, and the text documents may be identified as documents with textual content on colored paper, where the textual content is substantially similar. Accordingly, Bayesian analysis may be applied, and the feature processing module 106 may automatically identify color as an important distinguishing feature among the plurality of documents. Accordingly, document color may be identified as an augmented feature for the plurality of text documents. As another example, Bayesian analysis may be applied, and the feature processing module 106 may automatically identify paper size (e.g., legal, letter, etc.) as an important distinguishing feature among the plurality of documents. Accordingly, paper size may be identified as an augmented feature for the plurality of text documents. Also, for example, Bayesian analysis may be applied, and the feature processing module 106 may automatically identify orientation (e.g., landscape, portrait, etc.) as an important distinguishing feature among the plurality of documents. Accordingly, text orientation may be identified as an augmented feature for the plurality of text documents.

As another example, a first sub-plurality of the received plurality of text documents may include standard features such as currency symbols, graphs, numerals, known company names, dates, times, percentages, and so forth. A second sub-plurality of the received plurality of text documents may include standard features such as currency symbols, growth, economic sectors, interest rates, debts, country names, years, times, and so forth. Bayesian analysis may be applied, and the feature processing module 106 may automatically identify stock information for a company as an important feature for the first sub-plurality of documents, and may automatically identify GDP information for a country as an important feature for the second sub-plurality of documents. Accordingly, features related to stock information may be identified as augmented features for the first sub-plurality of text documents, and features related to GDP information may be identified as augmented features for the second sub-plurality of text documents.

As described herein, existing techniques identify standard features for the text document 102. For example, a "bag of words" may be associated with the text document 102. Also, for example, commonly occurring phrases, and/or combinations of words may also be identified as features and associated with the text document 102. Text mining processes, natural language processing, syntactic graphs, and so forth may be utilized to identify standard features associated with the text document 102. For example, standard features may include a string of numerals that may be identified as a date, a time, a credit card number (e.g., associated with a checksum verification to confirm that it is a valid credit card number), a telephone number, and so forth. In some examples, standard features may include bigrams, n-grams, and so forth.

Generally, the feature processing module 106 of system 100 extends such standard features to identify augmented features. The standard features may be supplemented with more specific and customized features that may be unique to a document, to identify augmented features for the text document 102. Accordingly, system 100 reaches beyond formulaic feature extraction based on syntactic and/or semantic properties. For example, the feature processing module 106 may identify patterns, regular expressions, syntactic structures, positional characteristics, format characteristics, and so forth that appear in the text document 102, and utilizes Bayesian analysis to intelligently learn from, and further identify relationships between the standard and/or augmented features that are identified.

In some examples, the plurality of augmented features may include at least one of local, sectional, and document-level features of the text document 102. Local features are generally features that appear locally in textual content. For example, "Barack" and "Obama" may be found next to each other in textual content. Sectional features are generally features that appear in a same section of the text document. The term "section" as used herein, may include a line, a paragraph, a numbered section, a sub-section, a page, a chapter, an interval of time, a range of values (e.g., a price range), and so forth. For example, "Barack Obama" may appear in the same line and/or paragraph. As another example, "USA" may appear in a section identified as "Chapter 1" whereas "Russia" may appear in a section identified as "Chapter 2". Also, for example, "Barack Obama" and "Vladimir Putin" may appear in the same paragraph, and these may be combined and identified as a sectional feature of the text document 102.

Document-level features are generally global features of a text document 102, such a number of documents, type of document, meta-data associated the document, color, size, text orientation, and so forth. In some examples, the document-level features may be indicative of a presence of a number of pages, a title, a table of contents, chapter headings, page numbering, a glossary, an index, a bibliography, and so forth. In some examples, document-level features may include inter-relationships between identified standard, and/or augmented features of the text document 102. For example, document-level features may include hyperlinks.

In some examples, document-level features may include sentiment analysis associated with the text document 102. For example, reviews of a document, popularity in a social networking domain (e.g., number of view, number of reviews, numbers of shares links, and so forth), may be some examples of sentiments associated with the text document 102. For example, "reviews of this document are generally positive", "reviews of this document are generally neutral", "this document is controversial", "this document is very popular" may be examples of sentiments associated with the text document 102.

In some examples, the plurality of augmented features may include the format features of the text document 102. For example, the feature processing module 106 may identify whitespace, lines, paragraphs, font characteristics, and so forth. In some examples, the feature processing module 106 may apply an entity matching procedure to match a given feature of the plurality of augmented features with a known entity. For example, the feature processing module 106 may apply an entity matching procedure to match a given feature of the plurality of augmented features with known entities, such as, for example, numerals, symbols, dates, names, places, things, geographical locations, units of measurement, currency symbols, icons, logos, company names, country names, URLs, and so forth.

In some examples, the feature processing module 106 may automatically determine structural characteristics of the text document 102 from positional characteristics of the identified plurality of augmented features, where the structural characteristics include at least one of a headline, title, caption, table, list, and grid. For example, the feature processing module 106 may automatically determine structural characteristics from the positional characteristics, and automatically associate a sub-plurality of the identified plurality of augmented features with the determined structural characteristics of the text document 102.

Generally, the positional characteristics of the text document 102 may include characteristics such as appearance of terms at the top of a page of the text document 102, appearance of terms marked by a beginning of a section, alignment of text, appearance of text in a row and/or column format, appearance of text in a multiple row and/or column format, appearance of a page number in a footer, appearance of information in the header, and so forth. Accordingly, the feature processing module 106 may determine structural characteristics from the identified positional characteristics. For example, the feature processing module 106 may determine a structural characteristic, such as a headline, based on an appearance of terms at the top of a page of the text document 102. Also, for example, the feature processing module 106 may determine a structural characteristic, such as a list, based on an appearance of text in a column format. In some examples, the list may be additionally enumerated (e.g., 1, 2, 3, . . . , A, B, C, . . . , and so forth). As another example, the feature processing module 106 may determine a structural characteristic, such as a table, based on appearance of text in a multiple row and column format.

For example, the feature processing module 106 may identify standard features such as a numerical order, a date, a time, a telephone number, and a dollar amount. The feature processing module 106 may further identify positional characteristics of the standard features to determine that the standard features appear in a multiple row and column format. Accordingly, the feature processing module 106 may automatically determine a structural characteristic, such as a table, based on the positional characteristics of the standard features. In some examples, based on a Bayesian analysis, and/or on labeled training data, the feature processing module 106 may automatically identify the augmented features to be indicative of content in a customer telephone bill. The term, "labeled training data" as used herein, generally refers to an actual class, or a list of classes, associated with a document. Generally, labeled training data may be generated based on at least one of supervised, unsupervised, and semi-supervised training.

In some examples, as described herein, the document processing module 104 may receive a list of classes for classification of the text document 102, and the feature processing module 106 may identify the plurality of augmented features based on the list of classes. For example, a plurality of documents may be received by the document processing module 104, along with an indication to classify them into a list of classes such as bank statements, income statements, phone bills, and credit card statements. Accordingly, the feature processing module 106 may identify the plurality of augmented features that are indicative of textual content in a bank statement, an income statement, a phone bill, and a credit card statement.

Upon identification of the plurality of augmented features, the feature processing module 106 extracts, via the processor, the identified plurality of augmented features from the text document 102. In some examples, the feature processing module 106 may maintain a count of the extracted features. In some examples, the feature processing module 106 may determine a term frequency, and/or a term frequency-inverse document frequency ("TFIDF") for a sub-plurality of the identified plurality of augmented features. In some examples, the feature processing module 106 may extract the identified plurality of augmented features in a sequential manner. In some examples, the feature processing module 106 may extract and store any associated links (e.g., positional, structural, hyperlinks, etc.) associated with the identified plurality of augmented features.

System 100 includes the feature representation generation module 108 to generate, via the processor, a feature representation of the text document 102 based on the extracted plurality of augmented features. For example, text tokenization techniques may be applied to generate a feature representation of the text document 102. Also, for example, a vector space model ("VSM") may be generated for the text document 102. Additional, and/or alternative techniques may be utilized to generate the feature representation of the text document 102.

In some examples, the feature representation generation module 108 may provide the feature representation to a text document classifier 110 to classify the text document 102. As described herein, the generated feature representation captures the augmented features of the text document 102. Accordingly, the text document classifier 110 is able to perform a more accurate classification of the text document 102.

In some examples, system 100 may include a training module (not shown in the figures) to train a machine learning model for text classification based on the generated feature representation. Generally, the training module is communicatively linked to the text document classifier 110 to enable classification of the text document 102. In some examples, the training module may train the machine learning model based on at least one of supervised, unsupervised, and semi-supervised training.

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated function.

For example, the document processing module 104 may be a combination of hardware and programming to receive the text document 102 via the processor. Also, for example, the document processing module 104 may include software programming to receive the text document 102. The document processing module 104 may include hardware to physically store and/or maintain a dynamically updated database that stores the received text document 102.

Likewise, the feature processing module 106 may be a combination of hardware and programming to identify augmented features in the text document 102. Also, for example, the feature processing module 106 may include software programming to automatically identify a plurality of augmented features in the text document 102 based on a Bayesian analysis of the text document 102. For example, the feature processing module 106 may include software programming to execute and/or access statistical models that perform Bayesian inference. Also, for example, the feature processing module 106 may include software programming instructions to extract, via the processor, the identified plurality of augmented features from the text document 102. The feature processing module 106 may include hardware to physically store, for example, the identified augmented features, and an association of the identified augmented features with the text document 102. Also, for example, the feature processing module 106 may include software programming to dynamically interact with the other components of system 100.

In like manner, the feature representation generation module 108 may be a combination of hardware and programming. For example, the feature representation generation module 108 may include software programming instructions to generate the feature representation of the text document 102 based on the extracted plurality of augmented features. Also, for example, the feature representation generation module 108 may include software programming instructions to generate feature vectors (e.g., in a vector space model) to represent the identified plurality of augmented features.

Generally, the components of system 100 may include programming and/or physical networks to be communicatively linked to other components of system 100. In some instances, the components of system 100 may include a processor and a memory, while programming code is stored and on that memory and executable by a processor to perform designated functions.

A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
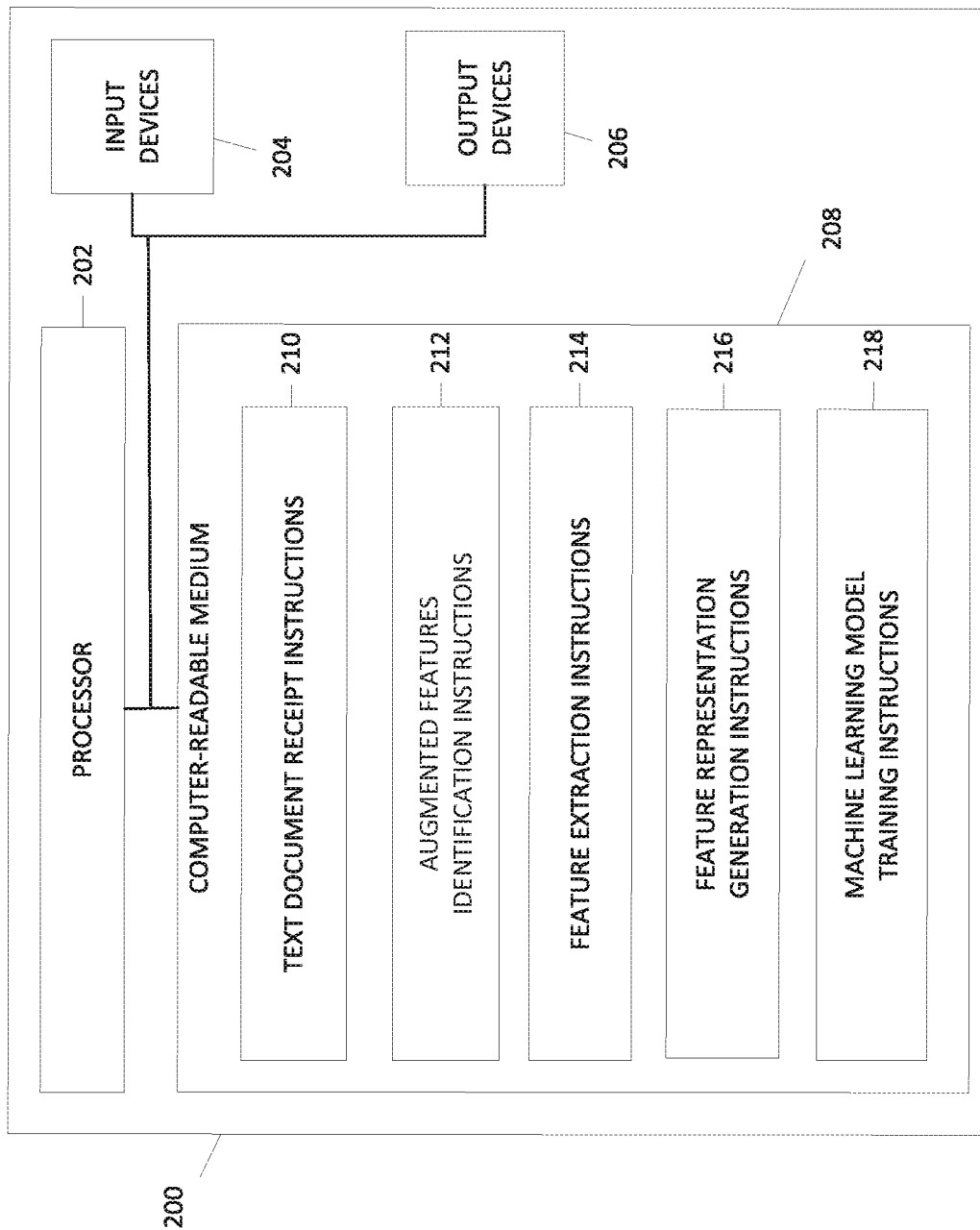
FIG. 2 is a block diagram illustrating one example of a computer readable medium for identifying augmented features based on a Bayesian analysis of a text document.

FIG. 2 is a block diagram illustrating one example of a computer readable medium for identifying augmented features based on a Bayesian analysis of a text document. Processing system 200 includes a processor 202, a computer readable medium 208, input devices 204, and output devices 206. Processor 202, computer readable medium 208, input devices 204, and output devices 206 are coupled to each other through a communication link (e.g., a bus).

Processor 202 executes instructions included in the computer readable medium 208. Computer readable medium 208 includes text document receipt instructions 210 to receive a text document via the processor 202.

Computer readable medium 208 includes augmented features identification instructions 212 to automatically identify, based on a Bayesian analysis of the text document, a plurality of augmented features in the text document, the plurality of augmented features including at least one of local, sectional, and document-level features of the text document.

Computer readable medium 208 includes feature extraction instructions 214 to extract, via the processor 202, the identified plurality of augmented features from the text document.

Computer readable medium 208 includes feature representation generation instructions 216 to generate, via the processor 202, a feature representation of the text document based on the extracted plurality of augmented features.

Computer readable medium 208 includes machine learning model training instructions 218 to train, based on the generated feature representation, a machine learning model for text classification.

Input devices 204 include a keyboard, mouse, data ports, and/or other suitable devices for inputting information into processing system 200. In some examples, input devices 204, such as a computing device, are used to receive the text document. Output devices 206 include a monitor, speakers, data ports, and/or other suitable devices for outputting information from processing system 200. In some examples, output devices 206 are used to provide a text document classification.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 208 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 200 are identified and refer to a combination of hardware and programming configured to perform a designated visualization function. As illustrated in FIG. 2, the programming may be processor executable instructions stored on tangible computer readable medium 208, and the hardware may include processor 202 for executing those instructions. Thus, computer readable medium 208 may store program instructions that, when executed by processor 202, implement the various components of the processing system 200.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 208 may be any of a number of memory components capable of storing instructions that can be executed by Processor 202. Computer readable medium 208 may be non-transitory in the sense that it does not encompass a transitory signal but instead is made up of one or more memory components configured to store the relevant instructions. Computer readable medium 208 may be implemented in a single device or distributed across devices. Likewise, processor 202 represents any number of processors capable of executing instructions stored by computer readable medium 208. Processor 202 may be integrated in a single device or distributed across devices. Further, computer readable medium 208 may be fully or partially integrated in the same device as processor 202 (as illustrated), or it may be separate but accessible to that device and processor 202. In some examples, computer readable medium 208 may be a machine-readable storage medium.

Figure 3:
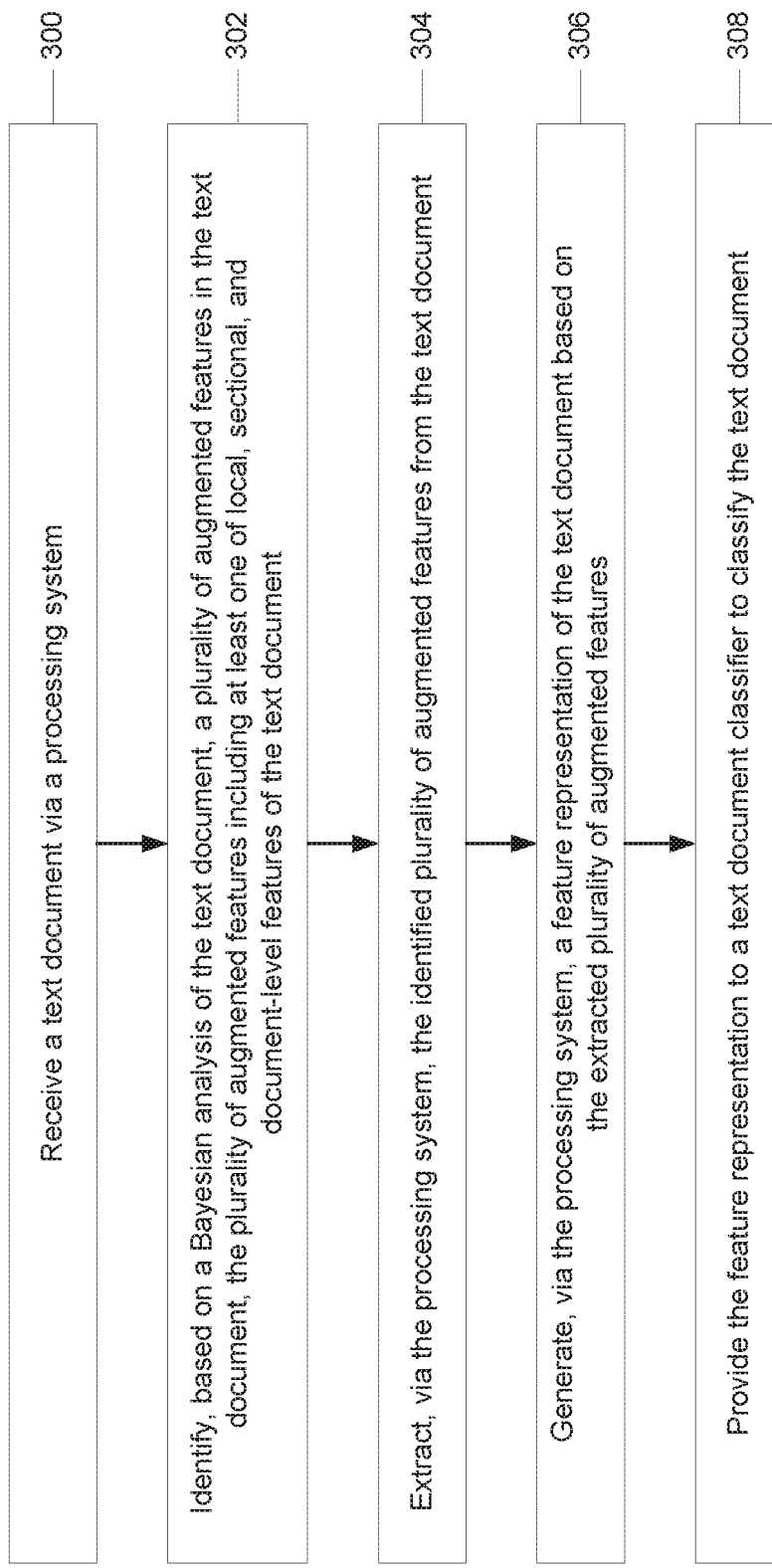
FIG. 3 is a flow diagram illustrating one example of a method for identifying augmented features based on a Bayesian analysis of a text document.

FIG. 3 is a flow diagram illustrating one example of a method for identifying augmented features based on a Bayesian analysis of a text document. In some examples, such an example method may be implemented by a system such as, for example, system 100 of FIG. 1.

At 300, a text document may be received via a processing system.

At 302, a plurality of augmented features may be identified in the text document based on a Bayesian analysis of the text document, where the plurality of augmented features include at least one of local, sectional, and document-level features of the text document.

At 304, the identified plurality of augmented features may be extracted from the text document via the processing system.

At 306, a feature representation of the text document may be generated via the processing system based on the extracted plurality of augmented features.

At 308, the feature representation may be provided to a text document classifier to classify the text document.

In some examples, the method may include automatically determining structural characteristics of the text document from positional characteristics of the identified plurality of augmented features, where the structural characteristics include at least one of a headline, title, caption, table, list, and grid.

In some examples, the plurality of augmented features may include format features of the text document, where the format features may include at least one of a whitespace, a line, and a font characteristic.

In some examples, the method may include matching a given feature of the plurality of augmented features with a known entity.

In some examples, the method may include receiving, via the processing system, a list of classes for classification of the text document, and identifying the plurality of augmented features based on the list of classes.

In some examples, the method may include training a machine learning model for text classification based on the feature representation.

Examples of the disclosure provide a generalized system for identifying augmented features based on a Bayesian analysis of a text document. The generalized system performs a Bayesian analysis of the text document and automatically identifies augmented features of a text document. Also, the generalized system automatically infers structural characteristics of the text document based on an identification of positional characteristics of the identified features. As described herein, such a generalized system enables a more efficient and accurate classification of the text document.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a processor; and
a memory storing instructions that when executed cause the processor to:
based on an application of a Bayesian analysis on a plurality of text documents, identify a first group of text documents containing a first distinguishing feature that distinguishes the first group of text documents from other text documents of the plurality of text documents;
identify formats related to the first distinguishing feature as augmented features of the first distinguishing feature in each document of the first group of text documents, including instructions that cause the processor to receive a list of classes for classification of the first group of text documents, and identify the augmented features in each document of the first group of text documents based on the list of classes;
determine structural characteristics of each document of the first group of text documents from positions of the augmented features of the first distinguishing feature in each document of the first group of text documents, wherein the structural characteristics indicate locations of the first distinguishing feature within a structure of each document of the first group of text documents;
create an association between the augmented features of the first distinguishing feature and the structural characteristics of each document of the first group of text documents;
extract the augmented features from the first group of text documents; and
generate a feature representation of the first group of text documents based on the extracted augmented features.

2. The system of claim 1, wherein the structural characteristics of each document of the first group of text documents include at least one of a headline, title, caption, table, list, and grid.

3. The system of claim 1, wherein the formats include at least one of a position of whitespace, a font characteristic, or a style characteristic of the first distinguishing feature.

4. The system of claim 1, wherein the instructions are executable to cause the processor to apply an entity matching procedure to match a given feature of the augmented features in the first group of text documents with a known entity.

5. The system of claim 1, wherein the instructions are executable to cause the processor to provide the feature representation to a text document classifier to classify the first group of text documents.

6. The system of claim 1, wherein the instructions are executable to cause the processor to train a machine learning model for text document classification based on the feature representation of the first group of text documents.

7. The system of claim 6, wherein the instructions are executable to cause the processor to train the machine learning model based on at least one of supervised, unsupervised, and semi-supervised training.

8. A method comprising:
receiving a plurality of text documents via a processing system;
identifying, based on a Bayesian analysis of the plurality of text documents, a first group of text documents containing a first distinguishing feature that distinguishes the first group of text documents from other text documents of the plurality of text documents;
identifying, by the processing system, formats related to the first distinguishing feature as augmented features of the first distinguishing feature in each document of the first group of text documents, including receiving a list of classes for classification of the first group of text documents, and identifying the augmented features in each document of the first group of text documents based on the list of classes;
determining, by the processing system, structural characteristics of each document of the first group of text documents from positions of the augmented features of the first distinguishing feature in each document of the first group of text documents, wherein the structural characteristics indicate locations of the first distinguishing feature within a structure of each document of the first group of text documents;
creating, by the processing system, an association between the augmented features of the first distinguishing feature and the structural characteristics of each document of the first group of text documents;
extracting, by the processing system, the augmented features from the first group of text documents;
generating, by the processing system, a feature representation of the first group of text documents based on the extracted augmented features; and
providing the feature representation of the first group of text documents to a text document classifier to classify the first group of text documents.

9. The method of claim 8, wherein the structural characteristics include at least one of a headline, title, caption, table, list, and grid.

10. The method of claim 8, wherein the formats include at least one of a position of whitespace, a font characteristic, or a style characteristic of the first distinguishing feature.

11. The method of claim 8, further comprising matching a given feature of the augmented features of the first distinguishing feature in the first group of text documents with a known entity.

12. The method of claim 8, further comprising training a machine learning model for text document classification based on the feature representation of the first group of text documents.

13. A non-transitory computer readable medium comprising executable instructions that when executed by a processor cause the processor to:
receive a plurality of text documents;
based on an application of a Bayesian analysis on the plurality of text documents, identify a first group of text documents containing a first distinguishing feature that distinguishes the first group of text documents from other text documents of the plurality of text documents;
identify formats related to the first distinguishing feature as augmented features of the first distinguishing feature in each document of the first group of text documents, including instructions that cause the processor to receive a list of classes for classification of the first group of text documents, and identify the augmented features in each document of the first group of text documents based on the list of classes;
determine structural characteristics of each document of the first group of text documents from positions of the augmented features of the first distinguishing feature in each document of the first group of text documents, wherein the structural characteristics indicate locations of the first distinguishing feature within a structure of each document of the first group of text documents;
create an association between the augmented features of the first distinguishing feature and the structural characteristics of each document of the first group of text documents;
extract the augmented features from the first group of text documents;
generate a feature representation of the first group of text documents based on the extracted augmented features; and
provide the feature representation to a text document classifier to classify the first group of text documents.

14. The non-transitory computer readable medium of claim 13, wherein the structural characteristics of each document of the first group of text documents include at least one of a headline, title, caption, table, list, and grid.

15. The non-transitory computer readable medium of claim 13, wherein the formats include at least one of a position of whitespace, a font characteristic, or a style characteristic of the first distinguishing feature.

16. The non-transitory computer readable medium of claim 13, wherein the instructions are executable to cause the processor to apply an entity matching procedure to match a given feature of the augmented features in the first group of text documents with a known entity.

17. The non-transitory computer readable medium of claim 13, wherein the instructions are executable to cause the processor to train a machine learning model for text document classification based on the feature representation of the first group of text documents.

* * * * *